United States Patent
Fornes

(10) Patent No.: US 6,322,171 B1
(45) Date of Patent: Nov. 27, 2001

(54) TRACK TENSIONING ASSEMBLY

(75) Inventor: Corey L. Fornes, Lisbon, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/498,110

(22) Filed: Feb. 4, 2000

(51) Int. Cl.$^7$ .................................................. B62D 55/00
(52) U.S. Cl. ............................................ 305/143; 305/151
(58) Field of Search ................................... 305/143, 145, 305/151, 152, 153; 180/9.54, 9.56

(56) References Cited

U.S. PATENT DOCUMENTS

| | | | |
|---|---|---|---|
| 2,022,079 | * 11/1935 | Eberhard | 305/152 |
| 2,506,619 | * 5/1950 | Schwartz | 305/152 |
| 2,716,577 | 8/1955 | Land . | |
| 2,717,813 | * 9/1955 | Gardner | 305/151 |
| 3,647,270 | 3/1972 | Althaus | 305/145 |
| 3,953,085 | * 4/1976 | Randour | 305/143 |
| 4,018,295 | 4/1977 | Hasselbacher | 180/9.5 |
| 4,088,377 | 5/1978 | Corrigan | 305/145 |
| 4,324,303 | * 4/1982 | Balzer et al. | 180/9.5 |

* cited by examiner

Primary Examiner—Russell D. Stormer
(74) Attorney, Agent, or Firm—Westman, Champlin & Kelly, P.A.

(57) ABSTRACT

A chain tensioner for a track of a track vehicle that has a track tensioning assembly including a compression spring mounted on to a shaft. The spring is captured between a pair of retainers, the outer end one of which is mounted to permit limited sliding movement of the spring during use. The limited sliding movement is provided by one of the retainers comprising a sliding block that is supported in position with a pair of cross pins that pass through cross recesses on opposite sides of the shaft to hold the block while permitting axial movement of the block between desired limits in longitudinal direction. The cross pins also to retain the block against rotation about the central axis of the shaft. The block will slide easily, and when used with hardened parts gets long wear life as well as maintaining a tension in the track as it moves.

11 Claims, 3 Drawing Sheets

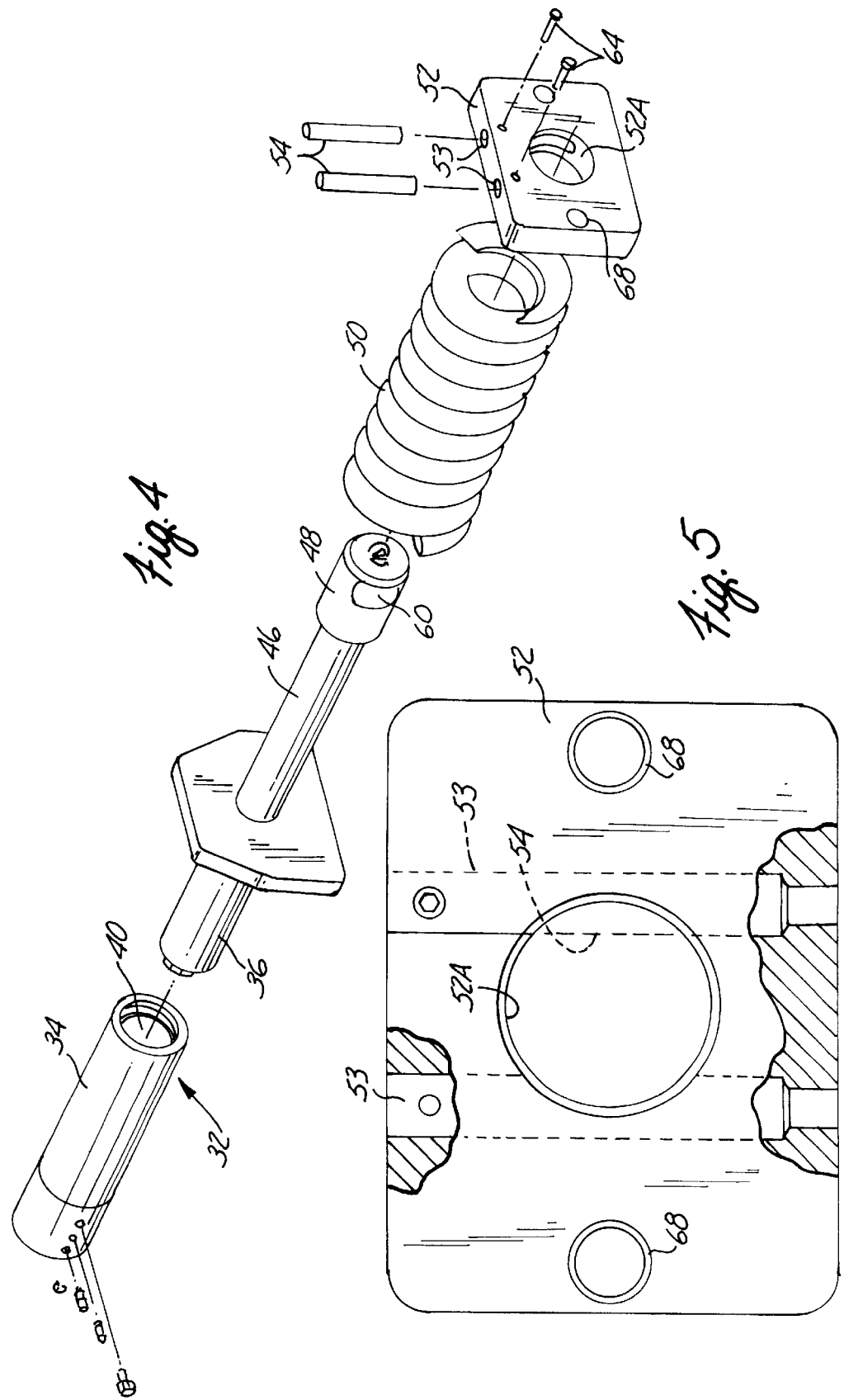

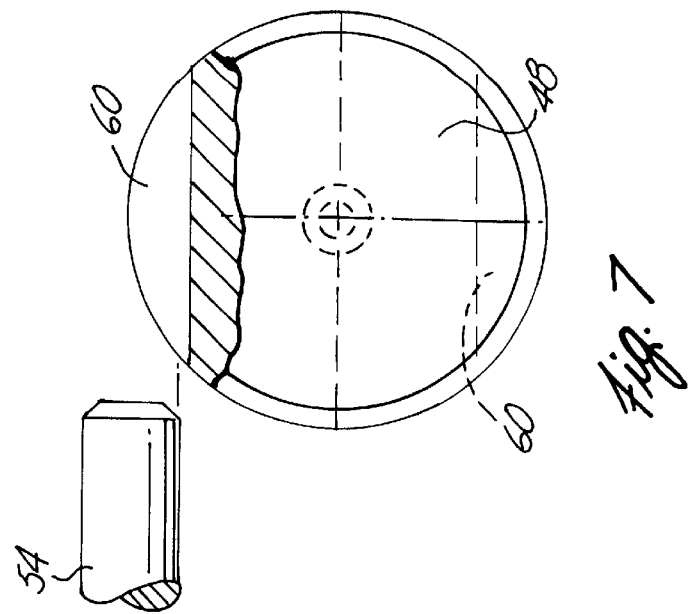
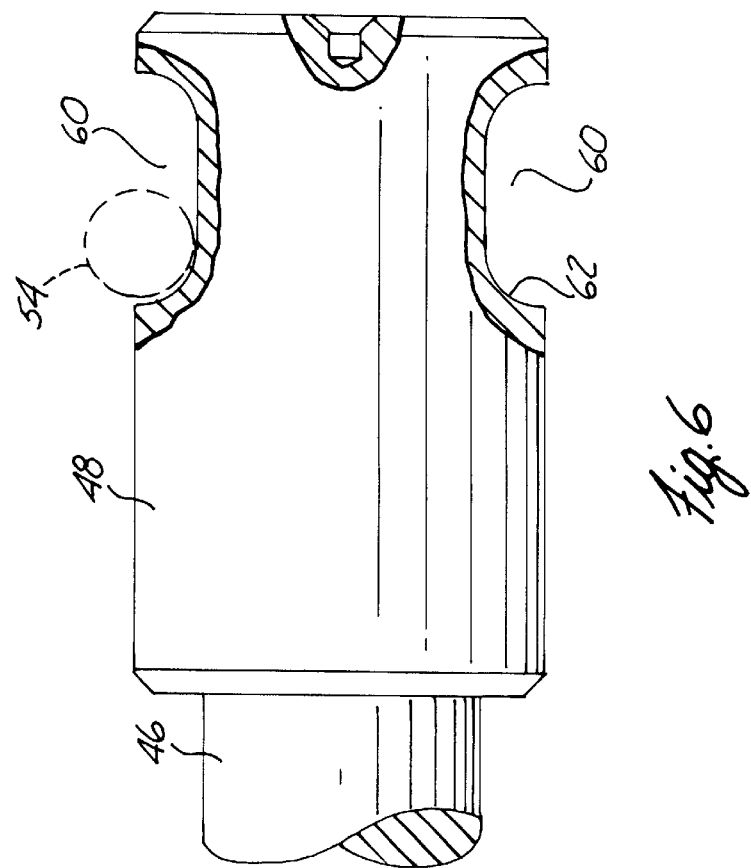

TRACK TENSIONING ASSEMBLY

BACKGROUND OF THE INVENTION

The present invention relates to a spring mounting for applying tension to an idler roller or other component for a track used in a track laying or crawler type vehicle. The track is mounted over drive and guide rollers and tension in the track is maintained with a heavy loading spring, an idler roller supported on an adjustable length grease cylinder providing initial length adjustment and preloading of the spring, the guiding of the spring as it residually moves is done in an improve, reliable and simple manner. The spring will automatically maintain tension in the track as the track moves.

In the prior art, various track tensioning devices have been used for track laying vehicles. One such device is shown in U.S. Pat. No. 3,647,270 and utilizes a cylinder that will provide for initial adjustment, and a spring mounting that will in turn accommodate overloads and will maintain a tension in the track during operation.

The track chain tensioning devices have to work in extreme conditions of dirt and grit, as well as other contaminants in which a tracked vehicle will operate, and thus, reliability in use with enhanced strength and wear characteristics are desired.

SUMMARY OF THE INVENTION

The present invention relates to a retaining and guiding assembly for the heavy spring used in a track tensioning device for track vehicles, and in particular mounts on an end of a shaft extending from a grease filled cylinder that provides initial adjustment of the position of the spring. The compression spring of the present invention is retained on the shaft with a sliding block that mounts onto the cylinder shaft and which permits preloading the spring and limited axial movement along the shaft as the spring compresses. The spring retaining block, in turn, mounts an idler roller or sprocket for a track laying vehicle, and when adjusted by initially moving the grease cylinder to its desired position, the spring in turn loads the track in tension and will accommodate length changes that occur because of flexing of the track during use. The tension is maintained on the track within a limited amount of compression of the spring determined by the permitted movement of the sliding block on its mounting.

In the form of the invention shown, the sliding block mounts on to a hardened end of the shaft of an adjustable cylinder, and has pins that extend perpendicular to the axis of the shaft and slide in notches along the sides of the shaft. The notches are a set length so that the amount of compression of the spring that is mounted on the shaft is predetermined. The sliding pins also can be hardened to reduce wear and exhibit adequate work characteristics. The block has a bore that is slightly larger than the shaft to permit the block to tilt on the shaft as needed to provide some flexibility, which in turn reduces the likelihood of malfunction or damage due to dirt or other contamination during working.

BRIEF DESCRIPTION OF THE DRAWINGS

FIG. 4 is a exploded view of the track tensioner of FIG. 3;

FIG. 5 is a end view of a retainer block used with the track tensioner of present invention with parts broken away for illustrating cross pin bores;

FIG. 6 fragmentary enlarged top view of a shaft end use in the rack tensioner of the present invention; and FIG. 7 is an end view of the shaft shown in FIG. 5, with parts broken away.

DETAILED DESCRIPTION OF THE ILLUSTRATIVE EMBODIMENTS

Figure 1:
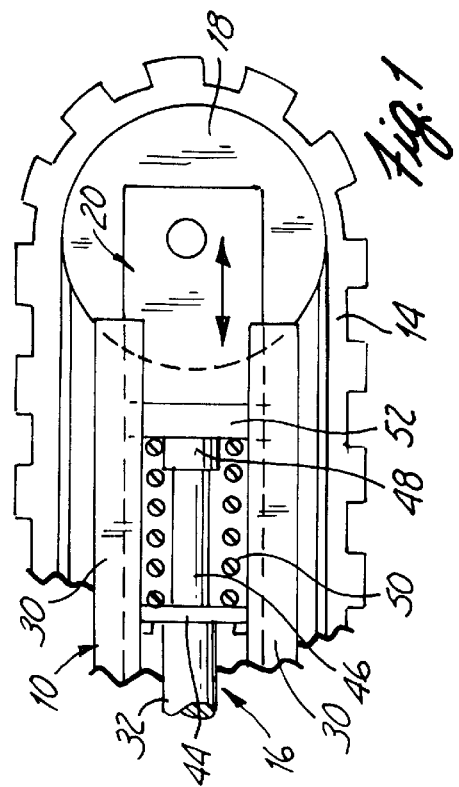
FIG. 1 is a fragmentary schematic side view of a track frame and track for a track laying vehicle having a track tensioner made according to the present invention.
Figure 2:
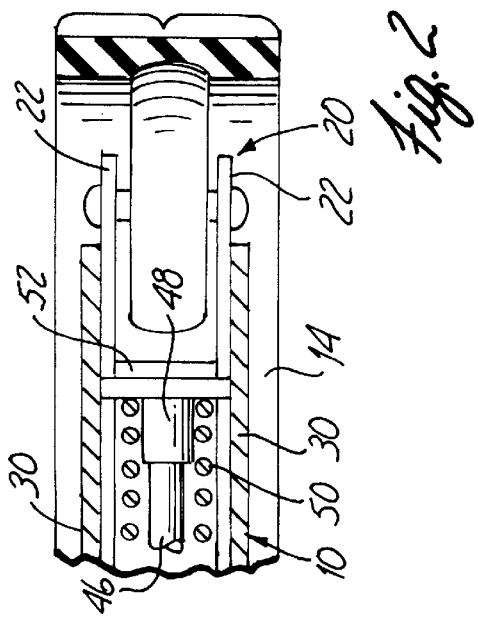
FIG. 2 is a fragmentary schematic top plan view of the tension own in FIG. 1.

A track frame 10 of a track laying vehicle mounts track drive sprockets (not shown) for driving an endless track 14. The track 14 is a conventional rubber or steel track and is maintained under tension with a tensioner assembly 16 made according to present invention. The tensioner assembly 16 is mounted in the frame 10, and includes an idler tension applying roller 18 that is rotatably mounted in a yoke 20. The yoke 20 has side plates 22 are guided frame longitudinal members 30 for fore and aft sliding. The yoke 20 can be separately guided so the spring applies compression loads on the yoke.

The support members 30 will retain the tensioner assembly 16 in position, and permit some movement of the yoke 20 to maintain a spring load on the yoke to exert tension on the track. The tensioner assembly 16, as shown, includes an initial adjustment grease filled cylinder or actuator 32 that includes an outer cylinder 34, and an interior sliding piston rod 36 that is sealed relative to the interior bore of the cylinder 34 in a normal manner. The rod 36 is the full diameter of the interior of cylinder 34. A grease zerk 38 is used for providing a filling of grease behind the piston rod 36 in the interior chamber illustrated at 40 (FIG. 4). The piston rod 36, as shown, has a shoulder surface 42 at an outer end thereof that provides a seat for retaining a spring support and load reaction washer 44. The washer 44 is held from sliding rearwardly on track frame side member 30 so the spring load on the yoke 20 and roller 18 is reached to the track frame.

The piston rod 36 has an outer end extending shaft portion 46 that extends outwardly from the shoulder surface 42. The shaft portion can be fixed to the rod in any suitable manner after washer 44 is in place. The shaft 46 has a shaft head portion 48 of larger diameter than shaft portion 46 at its outer end. A large compression spring 50 is mounted over the shaft end portion 48 and shaft 46, and seats against the washer 44 held by shoulder surface 42. The opposite end of the spring 50 engages a sliding block 52 that has an interior bore 52A that is larger than and fits over the shaft head portion 48. The outer face of block 52 engages the side plates 22 of the yoke 20 to spring load the yoke.

The block 52 is held in position on the shaft head with a pair of parallel cross pins 54 that pass through bores 53, which are perpendicular to the axis of the shaft 46 and shaft head 48. The pins fit into cross recesses or pin slides 60 formed along the opposite sides of the shaft head end 48, as shown in FIG. 6. The recesses or pin slides 60 extend in from the outer diameter of the shaft, and extend axially a selected distance. The recesses 60 have part cylindrical ends 62 with axis perpendicular to the shaft axis, which mate with the surfaces of pins 54. The part cylindrical ends 62 are spaced apart axially or longitudinally along shaft end 48, to provide an overall recess length that is greater than the diameter of the pins 54 so that the pins can move axially along the shaft head end 48 between the ends 62 of each of the recesses 60.

In this way the block 52 can slide for a limited amount in axial direction along the shaft 48 as the spring 50 compresses and returns to its extended retained position with the pins at an outer end of the recesses 60.

The pins 54 can be locked in place in bores 53 with suitable set screws 64 shown in FIG. 4, that thread into the block 52 and tighten against the pins 54 to hold the pins in place.

Thus is seen that the block 52 can slide in an axial direction of the shaft 46 between the ends of the pin slides or recesses. This will permit the idler roller 18 to compress the spring 50 from its normal position with block 52 at the outer end of recesses 60 to provide a spring loaded take up for the tack as track moves over obstacles, or in other ways gets loaded differently during use. This spring 50 will provide the resilient tension on the track as it is used.

The bore 52A, is formed to provide clearance relative to the shaft head portion 48, so that the block 52 can slide easily, and can tilt or cock to expel dirt and debris from the bore. The shaft head portion can have a hardened wear surface.

The pins 54 sliding in recesses 60 keep the block 52 oriented properly. The block 52 cannot rotate relative to the shaft head portion 48 due to the recesses 60 along the sides provide reaction surfaces that prevent rotation. The pins can tilt along the recesses to accommodate the tilting of block 52 to align with the spring during use. When being assembled, the spring 50 will be compressed against reaction washer or plate 44 with a loading fixture loading the block 52 and putting a preload on the spring 50 until the bores 53 are aligned with the recesses 60 so pins 54 can be placed into the bores 53 so the pins 54 extend across the recesses 60. Then the fixture load can be released and the pins 54 hold the block 52 and spring 50 assembled.

Figure 3:
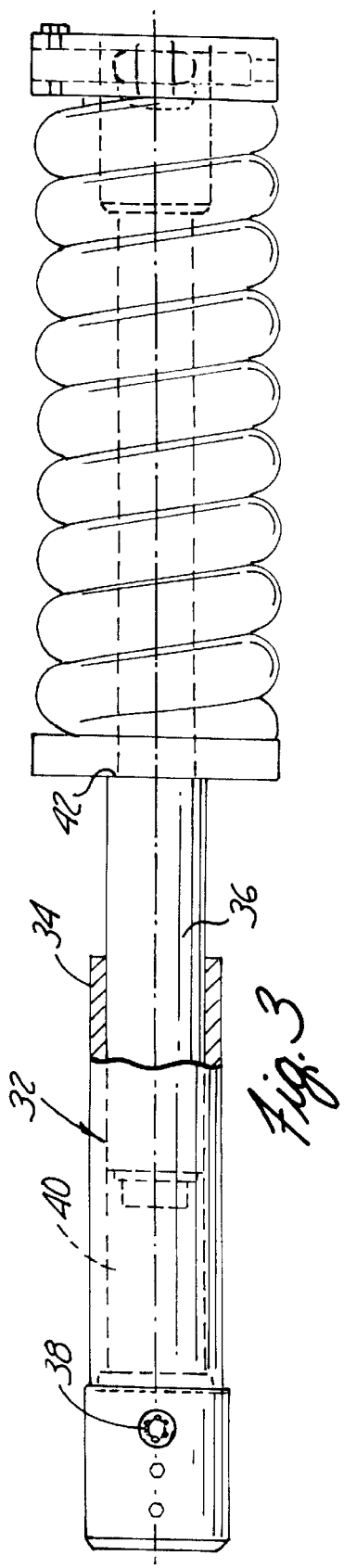
FIG. 3 is a side elevational view of the tensioner of FIG. 1 removed from the track assembly.

The end plate of the yoke 20 can be attached to the outer or front face of block 52 through suitable bores shown at 68 in FIGS. 3 and 5.

The chamber 40 in grease cylinder 34 is filled with grease under pressure to slide the piston rod 36 outwardly, and thus to move the spring 50, plate 44 and block 52 outwardly as well, until the spring 50 which is compressed a desired amount. Then the grease is left in place, as an initial setting, and the spring 50, is compressed, forces the pins 54 up against the outer end 62 of the recesses 60, so that when additional loads are applied, the block will slide away from the outer ends of recesses 60 therewardly and compress the spring 50.

Thus, a very efficient spring tensioner is provided for limiting the amount of compression that can be applied to the loading spring to prevent the spring from being overstressed or bottomed out, and yet permits tensioning a track chain for a limited amount of movement as the track chain load changes.

The end 48 of the shaft can have a hardened surface, at least along the recesses 60, as can the interior surface of the bore in the block 52. The pins 54 also can be hardened to reduce wear and also to make the parts slide more easily.

It is apparent that the tensioning assembly can be used for directly mounting any type of a chain tightener, if desired, as well as being used on the track tensioner that is shown.

Although the present invention has been described with reference to preferred embodiments, workers skilled in the art will recognize that changes may be made in form and detail without departing from the spirit and scope of the invention.

What is claimed is:

1. In combination with a track laying vehicle having a frame, and a track that is maintained under tension by a chain tensioner, the improvement comprising a tensioner assembly including an adjustable mount having an elongated support, a spring mounted on the elongated support and reacting load to the adjustable mount, and a sliding outer end block to provide a force on a chain tensioning element, said sliding end block fitting over the elongated support and engaging the spring, the elongated support having pin slides thereon, pins supported in the block and fitting within the pin slides, the pin slides having a length to permit sliding of the pins a limited amount in axial direction.

2. The improvement of claim 1, wherein said block has a bore that fits over the elongated support and has a selected clearance relative to the elongated support.

3. The improvement of claim 2 and locking set screws in the block to hold each of the pins in position in the block.

4. The improvement of claim 1, wherein said adjustable mount comprises a grease filled cylinder having an outer cylinder, and a piston rod, said piston rod being connected to said elongated support for moving the support, spring and block relative to the outer cylinder when the cylinder is filled with grease.

5. The improvement of claim 1, wherein the elongated support is a shaft and a washer that slidably mounts over an outer end portion of the shaft and fits against a shoulder on the shaft for the reacting load to the adjustable mount, an outer end of the shaft supporting the sliding end block.

6. A chain tensioning assembly for mounting a compression spring comprising a support, said support including a shaft portion, a spring mounted over the shaft portion and seated at an inner end to prevent movement of the spring inner end along the shaft when the spring is compressed, an outer end of the shaft having a sliding block thereon for engaging the spring, the sliding block having a bore for receiving the shaft, and at least one cross-pin that has a surface that extends partially into the bore, the shaft having a cross recess for receiving the portion of the cross-pin that extends into the bore, said cross recess on the shaft having a longitudinal length to permit the block to slide longitudinally along the shaft for a controlled distance.

7. The chain tensioner of claim 6 wherein there are a pair of cross pins that partially protrude into the said bore, said cross pins being parallel and being on opposite sides of the bore, said shaft having a pair of cross recesses for receiving the cross pins and permitting axial movement of the cross pins.

8. The chain tensioner of claim 6 wherein said shaft has a shoulder, a washer on the shoulder, and said washer supporting the inner end of the spring for seating the spring.

9. A chain tensioning assembly for mounting a compression spring comprising a shaft supported on a base, a compression spring mounted over the shaft, a pair of spring retainers on the shaft, at least one of the retainers having a bore receiving the shaft and being mounted for limited sliding axial movement on the shaft, a pair of parallel cross pins mounted on at least one retainer and extending across side portions of the bore, and recesses on opposite sides of the shaft to partially receive the cross pins, the recesses extending along the axial length of the shaft to permit axial movement of the cross pins and the at least one retainer.

10. The chain tensioning assembly of claim 9, wherein the bore of the at least one retainer is larger than the shaft to permit the at least one retainer to tilt relative to the shaft.

11. The chain tensioning assembly of claim 10, wherein at least a portion of the shaft that is in the bore of the at least one retainer has a hardened wear surface.

\* \* \* \* \*